United States Patent Office 3,496,411
Patented Feb. 17, 1970

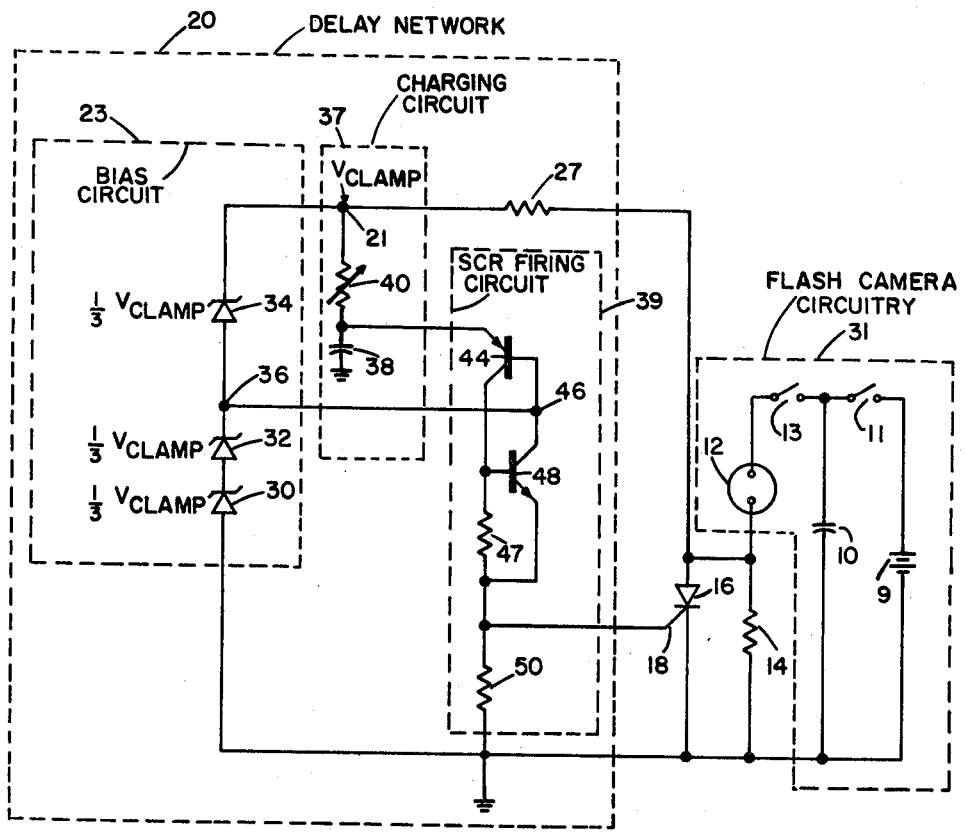

---

3,496,411
TIMING CIRCUIT FOR A FLASH CAMERA
James E. Thompson, Scottsdale, Ariz., assignor to Motorola, Inc., Franklin Park, Ill., a corporation of Illinois
Filed Apr. 1, 1968, Ser. No. 717,729
Int. Cl. H05b *41/14, 41/00*
U.S. Cl. 315—241        6 Claims

ABSTRACT OF THE DISCLOSURE

A timing circuit for a flash camera of the type having a storage capacitor for discharging into and firing the flash tube of the camera and a current limiting resistor in series with the flash tube. The timing circuit includes switch means such as a silicon controlled rectifier (SCR) connected to the current limiting resistor and a time delay network connected to the switch means. The time delay network responds to a timing voltage to fire the switch means a predetermined time after current begins to flow in the flash tube. The time delay network includes a bias circuit for providing a fixed voltage toward which storage means such as a capacitor will charge, and also includes a firing circuit connected between the storage means and the switch means. The firing circuit responds to a preselected voltage level on the storage means to rapidly fire the switch means a predetermined time after current begins to flow in the flash tube.

BACKGROUND OF THE INVENTION

This invention relates generally to light output control circuitry for flash cameras and more particularly to circuitry operative to control the energizing current through the flash tube in response to a timing voltage.

In the art of photography, and particularly electronic flash camera circuitry used to fire the flash tube of a camera, it is known to connect a storage capacitor in parallel with the flash tube and use this capacitor as a means for firing the flash tube. A common prior art circuit for performing this function includes a battery or an inverter connected to charge up the storage capacitor to a firing voltage and a means for switching the storage capacitor in parallel with the flash tube to discharge the capacitor through the flash tube when a picture is taken.

One disadvantage of the above-described prior art circuit is that this circuit includes no means to control the amount of capacitor discharge current through the flash tube in order to control the light output of the flash tube. In copending application, Ser. No. 717,674 of Reuben Wechsler assigned to the present assignee, novel circuits are described for controlling the light output of the flash tube by controlling the amount of resistance in series therewith. The present invention represents still further improvements in light output control circuitry and these improvements are set forth in the following description of operation of the circuit embodying the present invention.

SUMMARY OF THE INVENTION

An object of the present invention is to provide an improved timing circuit for a flash camera in which the light output of the camera is controlled independently of voltage variations in the circuit during capacitor discharge to fire the flash tube.

Another object of this invention is to provide a timing circuit for a flash camera which will fire at a precisely variable voltage level in accordance with the value of charging resistance in the circuit.

Briefly described, the present invention features a timing circuit for flash camera and the circuit includes a triggerable switch such as an SCR connected in parallel with a current limiting resistor for the flash tube of the camera. A time delay network is connected between the current limiting resistor and a point of reference potential and includes a bias circuit which is responsive to the voltage across the current limiting resistor to provide a fixed clamping voltage to which the remainder of the timing circuit responds. A charging circuit, including a storage means such as a capacitor, is connected to the bias circuit and charges up to a voltage sufficiently high to bias a firing circuit into conduction. The firing circuit is connected between the triggerable switch and the bias circuit, and the bias circuit insures that the firing circuit will always conduct and gate on the triggerable switch after the storage means is charged to a fixed voltage.

IN THE DRAWINGS

The present invention is illustrated in a single schematic diagram in the accompanying drawing.

DESCRIPTION OF THE INVENTION

Standard flash camera circuitry 31 includes a battery 9 and a capacitor 10 connectable in parallel with a flash tube 12. Upon closure of switch 11, the capacitor 10 will charge to a voltage sufficiently high to fire the flash tube 12, and capacitor 10 will discharge through flash tube 12 and current limiting resistor 14 upon closure of the switch 13.

Prior to the invention disclosed and claimed in the above-identified copending Wechsler application Ser. No. 717,674, there was no circuitry available to control the light output of the flash tube 12 in response to voltage developed across the resistance in series with the flash tube 12. In the copending Wechsler application Ser. No. 717,674, there are circuits disclosed in which this series resistance is controlled either by setting an adjustable resistor or by varying the series resistance as a function of time. However, the present invention represents further improvements over the Wechsler invention in that the bias and firing circuits are included to insure precise timing for shunting the current limiting resistance in series with the flash tube. These bias and firing circuits are included in a novel combination of circuit elements designated as a delay network 20. The delay network 20 includes a bias circuit 23 and a charging circuit 37 connected as shown to an SCR firing circuit 39. These three circuits combine to provide a firing voltage at the SCR 16 at a precisely adjustable time after current begins to flow in the flash tube 12 and resistor 14. The SCR firing circuit 39 is connected to the gate electrode 18 of the SCR 16 and provides a firing voltage thereat in accordance with the following description of circuit operation.

OPERATION

The timing for firing the SCR 16 begins with the initial current flow through resistor 14, and such current flow develops a voltage across resistor 14 which is much in excess of the clamping voltage $V_{CLAMP}$ at point 21. When $V_{CLAMP}$ is reached, the Zener diodes 30, 32 and 34 are biased into conduction to clamp point 21 at approximately 21 volts or three times the Zener voltage, e.g., 7 volts, of a single Zener diode. This clamping of the voltage at point 21 insures that the charging circuit 37 will be charged by a constant voltage which is independent of variations in current through the flash tube 12.

The charging circuit 37, which includes a variable charging resistor 40 (which is adjustable to set the delay of network 20) and a storage capacitor 38, is connected between point 21 and a reference potential, and the capacitor 38 is connected directly to the emitter of PNP transistor 44 in the SCR firing circuit 39. An intermediate point 36 between Zener diodes 32 and 34 is connected to the base of transistor 44 so that the base voltage of transistor 44 is clamped to approximately 14 volts or ⅔ $V_{CLAMP}$. The latter connection insures that transistor 44 will fire when the voltage across capacitor 38 reaches 14 volts plus the $V_{BE}$ offset voltage of transistor 44. $V_{BE}$ is typically in the order of .6 or .7 volt. Thus, the charging circuit 37 is always charged by a constant voltage appearing at point 21 and will always bias PNP transistor 44 into conduction upon reaching a predetermined voltage at a predetermined time after capacitor 38 begins charging.

When the emitter of transistor 44 reaches 14 volts plus the $V_{BE}$ voltage of transistor 44, transistor 44 conducts and, by regenerative action, rapidly turns on transistor 48. Current from transistor 48 develops a voltage across resistor 50 sufficient in magnitude to fire the SCR16. The particular connection of transistor 44 and transistor 48 insures rapid regenerative turn-on drive at the control or gate electrode 18 of the SCR16.

Resistor 47, which is connected between the base and emitter electrodes of transistor 48, is optional and may be eliminated if desired. This resistor 47 reduces the low current gain of transistor 48 and prevents firing of transistor 48 on leakage current.

Since the time constant of any RC series circuit is the time required for a capacitor to charge to approximately 63% of its maximum charging voltage, then the time constant of the charging circuit 37 is that time required for capacitor 38 to charge to approximately 63% of 21 volts. This voltage will be slightly less than the 14 volts plus one $V_{BE}$ required to bias transistor 44 into conduction. Thus, at some time which is slightly longer than the time constant of the series RC charging circuit 37, the capacitor 38 will be charged to a value sufficient to bias PNP transistor 44 into conduction, i.e., approximately 67% of 21 volts plus the $V_{BE}$ of transistor 44 or 14 volts plus one $V_{BE}$. This feature insures that the firing circuit 39 will always trigger on a relatively steep portion of the RC charging characteristic of the RC charging circuit 37 and thus minimize errors in timing due to the voltage variations in the circuit.

The following table lists the values of components used in a circuit of the type described which has been actually built and successfully operated. However, said table should not be construed as limiting the scope of this invention.

TABLE

| Component: | Value |
| --- | --- |
| Resistors— | |
| 14C | 15 ohms. |
| 27 | 10,000 ohms. |
| 40 | 150,000 ohms. |
| 47 | 50,000–100,000 ohms. |
| 50 | 1,000 ohms. |
| Capacitors— | |
| 10 | 500 μfd. to 1250 μfd. |
| 38 | .1 μfd. |

The above described invention is limited only by way of the following appended claims.

I claim:
1. A timing circuit for a flash camera of the type having a flash tube connected in series with a current limiting resistor, said timing circuit including, in combination:
   switch means connected in parallel with said resistor for shunting said resistor upon receipt of a firing voltage,
   a time delay network connected to said switch means and operative to provide a firing voltage thereat at a predetermined time after current begins to flow in said flash tube, said time delay network including,
   a bias circuit connected between said current limiting resistor and a point of reference potential and operative to become biased to a predetermined clamping voltage after said flash tube conducts,
   a charging circuit connected to said bias network and operative to charge toward said clamping voltage, and
   a firing circuit connected between said charging circuit and said switch means and biased conductive by said charging circuit when the latter charges to a predetermined voltage, said firing circuit further connected to a point on said bias circuit and receiving therefrom a predetermined percentage of said clamping voltage, so that said firing circuit will conduct only after said charging circuit reaches a fixed voltage in excess of said predetermined percentage of said clamping voltage.

2. The timing circuit defined in claim 1 wherein:
   said first circuit includes a pair of regeneratively-coupled transistors connected between said switch means and said charging circuit for rapidly firing said switch means upon receipt of a predetermined voltage from said charging circuit, and
   said switch means includes a triggerable switch having a gate electrode thereof connected to said firing circuit for receiving a gate voltage sufficient to bias said triggerable switch into conduction.

3. The timing circuit defined in claim 2 wherein:
   said bias circuit includes a plurality of Zener diodes connected between said charging circuit and a point of reference potential, and
   means connecting a point between said Zener diodes to one of said pair of regeneratively-coupled transistors for providing a DC bias voltage thereto which insures that said one transistor will conduct only after said charging circuit reaches said predetermined voltage.

4. The timing circuit defined in claim 3 wherein:
   said charging circuit includes a charging resistor serially connected to a capacitor between said bias circuit and said point of reference potential, and
   said capacitor connected to said one transistor in said regeneratively-coupled pair of transistors for biasing said transistors into conduction and firing said triggerable switch.

5. The timing circuit defined in claim 4 which further includes:
   a current limiting resistor connected between said flash tube and said bias circuit for limiting the current flow thereto, and
   a resistor connected between the other of said pair of regeneratively-coupled transistors and a point of reference potential and receiving therethrough a drive current sufficient to develop a gate voltage at the control electrode of said triggerable switch for firing said triggerable switch.

6. The timing circuit defined in claim 5 wherein:
   said triggerable switch is a semiconductor controlled rectifier having the anode thereof connected to said flash tube, the cathode thereof connected to a point of reference potential, and the gate electrode thereof connected to the last-named resistor.

References Cited

UNITED STATES PATENTS

| | | | |
| --- | --- | --- | --- |
| 2,901,671 | 8/1959 | Most | 315—219 |
| 3,122,677 | 2/1964 | Flieder | 315—241 |
| 3,296,947 | 1/1967 | Engelsmann et al. | 95—1 |

JOHN W. HUCKERT, Primary Examiner

R. F. POLISSACK, Assistant Examiner

U.S. Cl. X.R.

315—119, 125, 126, 200, 238, 241, 245